US009569266B2

(12) United States Patent
Chen et al.

(10) Patent No.: US 9,569,266 B2
(45) Date of Patent: Feb. 14, 2017

(54) APPARATUS, METHOD, AND COMPUTER PROGRAM PRODUCT FOR SOLUTION PROVISIONING

(71) Applicant: International Business Machines Corporation, Armonk, NY (US)

(72) Inventors: Ying Chen, Beijing (CN); Le He, Beijing (CN); Wu Yu Hui, Beijing (CN); Xing Jin, Beijing (CN); Qing Bo Wang, Beijing (CN); Yang Zhao, Xicheng District (CN); Zhi Le Zou, Beijng (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/589,868

(22) Filed: Jan. 5, 2015

(65) Prior Publication Data
US 2015/0121394 A1    Apr. 30, 2015

Related U.S. Application Data

(63) Continuation of application No. 13/065,916, filed on Mar. 31, 2011, now Pat. No. 8,930,949.

(30) Foreign Application Priority Data

Mar. 31, 2010    (CN) .......................... 2010 1 0139125

(51) Int. Cl.
*G06F 9/50*    (2006.01)
*G06F 11/30*    (2006.01)

(52) U.S. Cl.
CPC .......... *G06F 9/5005* (2013.01); *G06F 9/5011* (2013.01); *G06F 9/5027* (2013.01); *G06F 9/5061* (2013.01);
(Continued)

(58) Field of Classification Search
None
See application file for complete search history.

(56) References Cited

U.S. PATENT DOCUMENTS 7,516,457 B2    4/2009    Eilam et al.
8,930,949 B2    1/2015    Chen et al.
(Continued)

FOREIGN PATENT DOCUMENTS

CN    1916846 A    2/2007
CN    101114227 A    1/2008
(Continued)

OTHER PUBLICATIONS

HP News Release "HP Accelerates Cloud Computing Adoption for Businesses and Service Providers," Hewlett-Packard Development Company, L.P., Dec. 16, 2009, pp. 1-2, downloaded from: http://www.hp.com/cgi-bin/pf-new.cgi?in=referrer on Dec. 23, 2009.
(Continued)

*Primary Examiner* — Qing Wu
(74) *Attorney, Agent, or Firm* — Zilka-Kotab, PC

(57) ABSTRACT

In one embodiment, a method for solution provisioning includes establishing a provisioning task, and obtaining a provisioning image for the provisioning task from a hardware memory. A provisioning implementer is configured based on the obtained provisioning image. The provisioning image comprises configuration information used for executing installation, scripts for executing installation, and information for mapping the configuration information to the scripts. In another embodiment, an apparatus for solution provisioning includes a hardware processor, and a task manager running on the hardware processor. The task manager is configured to establish a provisioning task and obtain a provisioning image for the provisioning task. The task manager configures a provisioning implementer based on the provisioning image obtained. The provisioning image
(Continued)

comprises configuration information used for executing installation, scripts for executing installation, and information for mapping the configuration information to the scripts.

20 Claims, 6 Drawing Sheets

(52) U.S. Cl.
CPC ........ *G06F 11/3051* (2013.01); *G06F 11/3006* (2013.01)

(56) References Cited

U.S. PATENT DOCUMENTS

| | | |
|---|---|---|
| 2003/0200299 A1 | 10/2003 | Jamison, III |
| 2006/0047813 A1 | 3/2006 | Aggarwal et al. |
| 2006/0056618 A1 | 3/2006 | Aggarwal et al. |
| 2009/0300608 A1 | 12/2009 | Ferris et al. |
| 2011/0265087 A1 | 10/2011 | Chen et al. |

FOREIGN PATENT DOCUMENTS

| | | |
|---|---|---|
| CN | 101189595 A | 5/2008 |
| CN | 101256495 A | 9/2008 |

OTHER PUBLICATIONS

LG Dacom KiDC—Microsoft Dynamic Data Center: Cloud Infrastructure Solution Case Study "Leading the Cloud Market with the Implementation of a Dynamic Data Center Cloud Infrastructure," Aug. 2009, pp. 1-3, downloaded from: http://download.microsoft.com/download/0/8/6/0868F190-1467-4D26-9ACE-C1E718EA5FAC/LGDacomKIDC.pdf on Mar. 31, 2011.

Mather, T., "Big Security Improvement for Cloud Computing," 2009 RSA Conference, posted Aug. 28, 2009, pp. 1-2, downloaded from: http://365.rsaconference.com/blogs/tim-mather/2009/08/28/big-security on Dec. 23, 2009.

Pant et al., "Cloud Computing," Computer Society of India, 2009, pp. 1-6, downloaded from: http://sci-india.org/cloud-computing on Dec. 23, 2009.

Wu et al., "SPA: A Comprehensive Framework for Hybrid Solution Provisioning," IEEE International Conference on Web Services, Jul. 6-10, 2009, pp. 421-428.

Non-Final Office Action from U.S. Appl. No. 13/065,916, dated Mar. 18, 2014.

Final Office Action from U.S. Appl. No. 13/065,916, dated Jul. 2, 2014.

Notice of Allowance from U.S. Appl. No. 13/065,916, dated Sep. 3, 2014c.

Chen et al., U.S. Appl. No. 13/065,916, filed Mar. 31, 2011.

APPARATUS, METHOD, AND COMPUTER PROGRAM PRODUCT FOR SOLUTION PROVISIONING

RELATED APPLICATIONS

This application is a continuation of U.S. Pat. No. 8,930,949, which claims priority to Chinese Patent Application No. 201010139125.4 filed on Mar. 31, 2010, and which are herein incorporated by reference.

BRIEF SUMMARY

In one embodiment, a method for solution provisioning includes establishing a provisioning task, and obtaining a provisioning image for the provisioning task from a hardware memory. A provisioning implementer is configured based on the obtained provisioning image. The provisioning image comprises configuration information used for executing installation, scripts for executing installation, and information for mapping the configuration information to the scripts.

In another embodiment, an apparatus for solution provisioning includes a hardware processor, and a task manager running on the hardware processor. The task manager is configured to establish a provisioning task and obtain a provisioning image for the provisioning task. The task manager configures a provisioning implementer based on the provisioning image obtained. The provisioning image comprises configuration information used for executing installation, scripts for executing installation, and information for mapping the configuration information to the scripts.

In yet another embodiment, a computer program product for solution provisioning includes a computer readable storage medium having program instructions embodied therewith, the program instructions executable by a processor to cause the processor to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
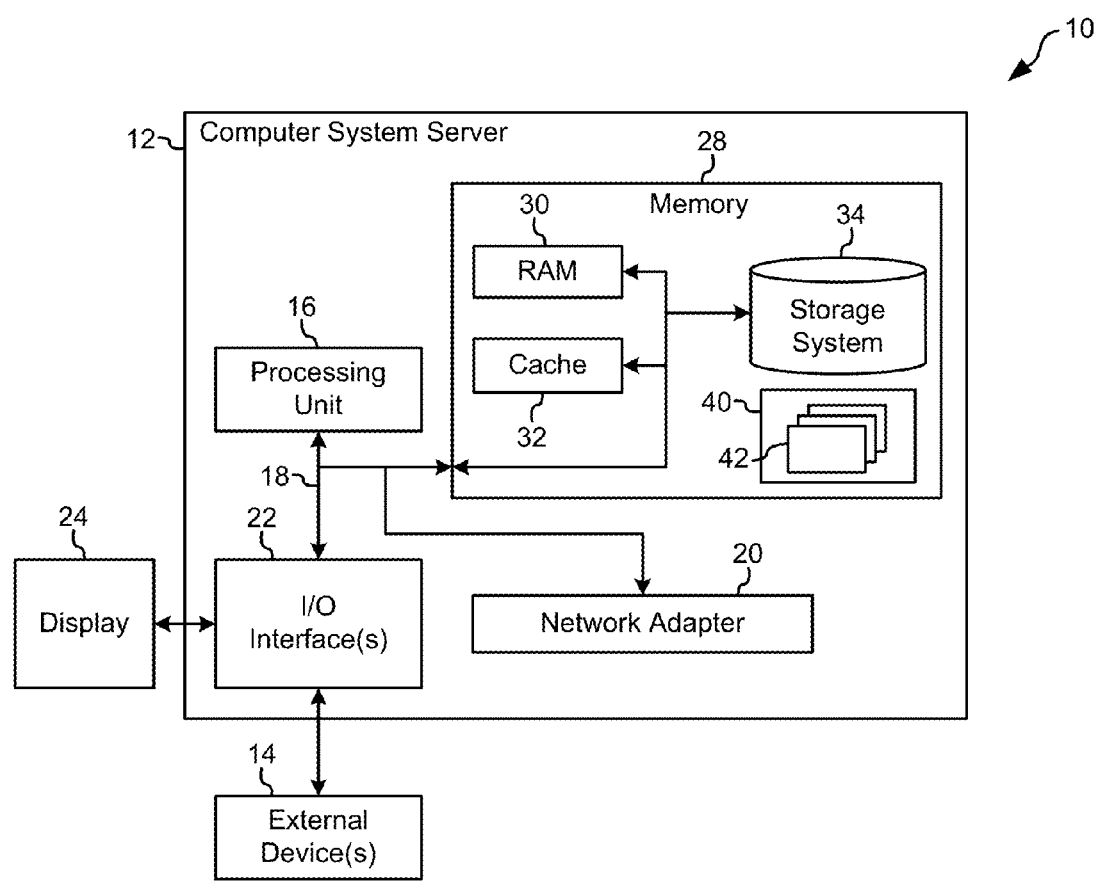
FIG. 1 depicts a cloud computing node, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of storage systems which allow data providers to share non-confidential information without marking confidential information on their enterprise systems. For example, in one non-limiting embodiment, multiple entities can share lists of data identifiers of files on their enterprise systems, duplicate data identifiers can be identified (which indicates that the files associated with the data identifiers are non-confidential since they appear on multiple entities' enterprise systems), and those files having duplicate data identifiers may be stored in the storage network without exposing any confidential data from any of the entities' enterprise systems.

Solution provisioning, as used herein, refers to procuring and preparing any systems, devices, connections, software, hardware, etc., to be used that enables a user or group of users to perform desired tasks, such as through server provisioning (including preparing one or more servers with appropriate systems, data, software, etc., and making the one or more servers available for network operations), user provisioning (including creating, maintaining, deactivating, modifying, etc., user objects, user attributes, user accounts, etc., as they exist in one or more systems, directories, or applications, possibly in response to a request, system action, etc.), network provisioning (including preparing and activating mobile networks, internet resources, intranet resources, LAN resources, etc., along with mobile devices, network devices, routers, switches, etc., enabling connections from devices to the networks, etc.), etc., as would be understood by one of skill in the art upon reading the present descriptions.

A provisioning task, as used herein, refers to any action taken in order to provide a user or group of users with the ability to perform one or more desired tasks, such as through procurement of resources, preparation of systems, devices, connections, etc., initialization of resources, deactivation of resources, etc., as would be understood by one of skill in the art upon reading the present descriptions.

A provisioning image, as used herein, refers to a collection of information that is provided to one or more servers such that a user or group of users is capable of accessing and utilizing a solution. The provisioning image may include configuration information used for executing installation, scripts of any type (e.g., commands and/or executable code) for executing installation, and/or information for mapping the configuration information to the scripts, and may relate to an image or virtual machine of any software, device, system, server, operating system (OS), etc. In a cloud computing environment, physical software products such as OS, middleware, software package, virtual machines, virtual servers, etc., may be included in information of a provisioning image.

A provisioning implementer, as used herein, refers to a module that is capable of performing provisioning tasks, as described herein, as well as procuring resources and utilizing a provisioning image to formulate one or more aspects of a provisioning solution to a user or group of users, such as on a server, virtual server, virtual machine, etc. When the provisioning implementer is used, it may be launched by any system, device, routine, application, etc., such that it performs its responsibilities according to its designated functionality.

In one general embodiment, an apparatus for solution provisioning includes a task manager configured to, in response to a received solution provisioning request, establish a provisioning task and obtain a provisioning image for the provisioning task, and a provisioning implementer configured to execute and monitor the provisioning task established by the task manager, wherein the task manager configures and launches the provisioning implementer based on the provisioning image obtained, and wherein the provisioning image comprises configuration information used for executing installation, scripts for executing installation, and information for mapping the configuration information to the scripts.

In another general embodiment, a method for solution provisioning includes establishing a provisioning task in response to a received solution provisioning request, obtaining a provisioning image for the provisioning task, configuring and launching a provisioning implementer based on the obtained provisioning image, and executing and monitoring the provisioning task using the provisioning implementer, wherein the provisioning image comprises configuration information used for executing installation, scripts for executing installation, and information for mapping the configuration information to the scripts.

In yet another general embodiment, a computer program product for solution provisioning includes a computer readable storage medium having computer readable program code embodied therewith, the computer readable program code including computer readable program code configured to: establish a provisioning task in response to a received solution provisioning request, obtain a provisioning image for the provisioning task, configure and launch a provisioning implementer based on the obtained provisioning image, and execute and monitor the provisioning task using the provisioning implementer, wherein the provisioning image comprises configuration information used for executing installation, scripts for executing installation, and information for mapping the configuration information to the scripts.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
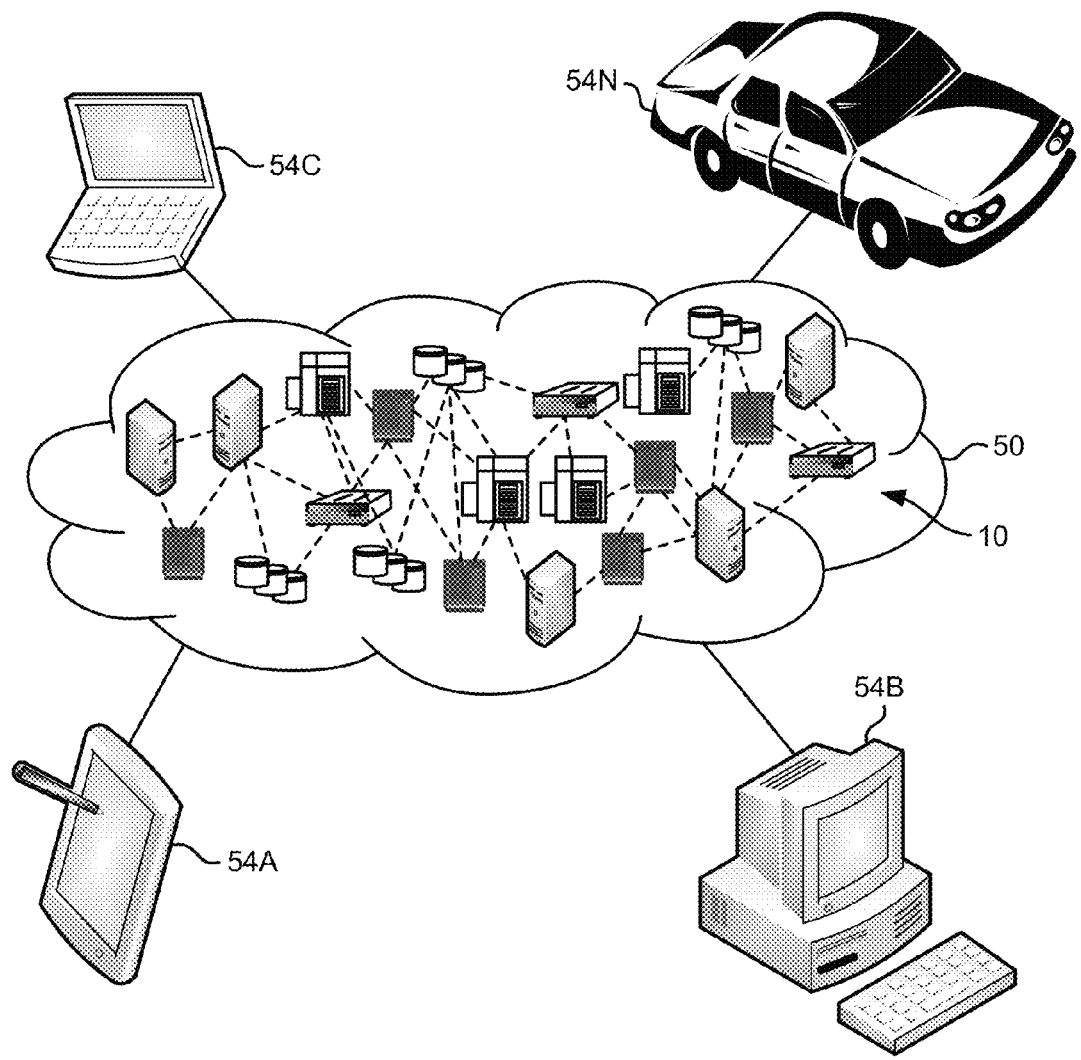
FIG. 2 depicts a cloud computing environment, according to one embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
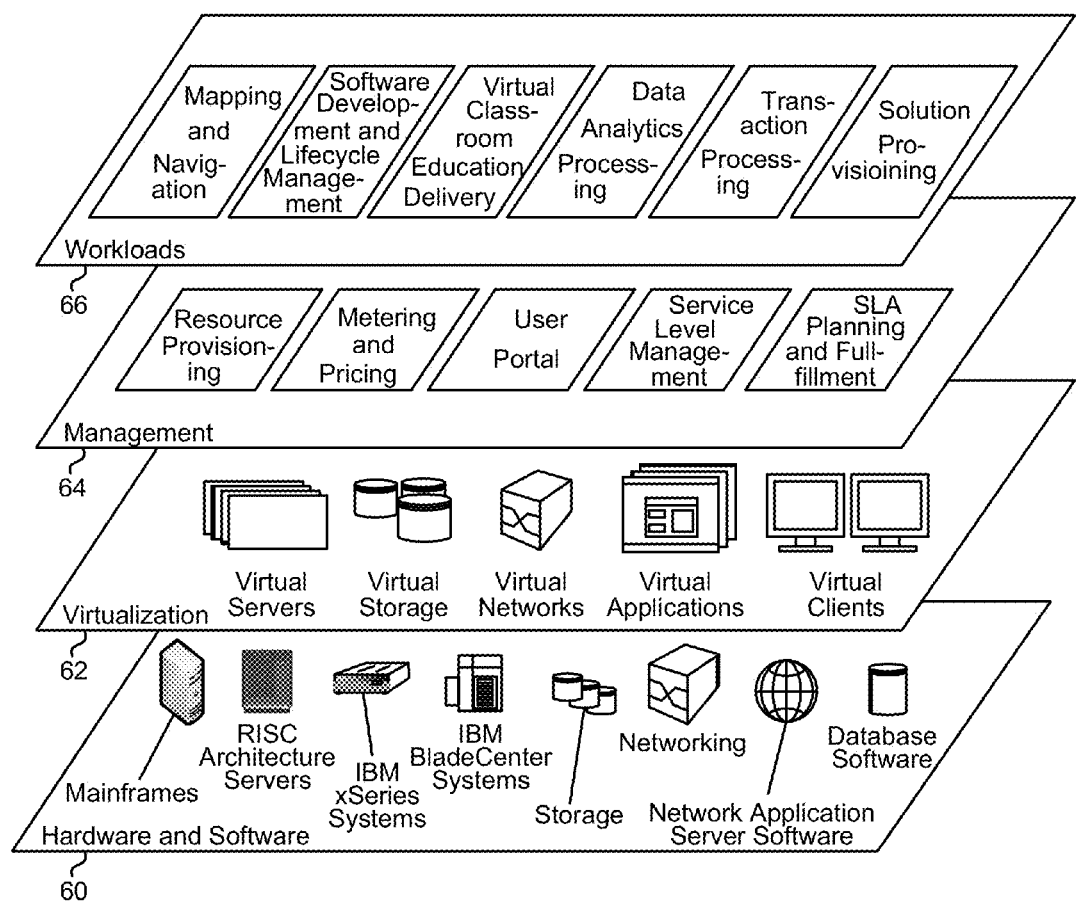
FIG. 3 depicts abstraction model layers, according to one embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2C® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; solution provisioning; etc.

The following problems have typically existed in provisioning methods in the prior art: (1) Diversity of software products: there are numerous types of software products in a cloud environment, both physical software products and virtual software products; however, the physical software products and virtual software products are very different in configuration and installation requirements, among other things; (2) High provisioning operation cost: different software is installed with product specific approaches, such that the personnel who can successfully install one software may fail to install another software, more operation personnel, such as administrative staff, is required to handle the provisioning tasks considering the number of software products, and it takes more time to configure and execute the provisioning tasks considering the number of software products used; (3) High solution provisioning complexity: solution configuration complexity, the configuration information required by physical software products and virtual software products are very different, and the configuration information usually requires the user's manual input, no common process to drive the provisioning of solutions which may include both physical solution and virtual solutions, the provisioning processes required by physical software products and virtual software products are very different from each other, and the installation of the solutions requires the installing personnel, such as the administrative staff, to be familiar with the installation processes of virtual software products as well as that of physical software products, while a common software installing technician usually cannot meet such requirements.

Accordingly, there is a need for a solution provisioning method which allows the user to provision a solution conveniently and quickly, and which is transparent as to whether the solution is a physical solution or a virtual solution, or a solution which combines a physical and a virtual solution.

The following exemplary embodiments help to further define and describe solution provisioning techniques and systems. It is to be understood that the invention is not limited to the exemplary embodiments disclosed. It should further be understood that not every feature of the presently disclosed methods, apparatuses, computer program products, and systems for solution provisioning are necessary to implement the invention. It should further be understood that throughout this disclosure, where a process or method is shown or described, the operations of the method may be performed in any order or concurrently, unless it is clear from the context that one operation depends on another operation being performed previously.

As described above, the provisioning methods in the prior art fail to shield the differences in structures of physical and virtual solutions for users, and also fail to shield the differences in provisioning processes of physical and virtual solutions for users. Obviously, there is a lack of a unified solution representation from the perspective of provisioning in the prior art: this is due, at least in part, to physical solutions and virtual solutions being very different in configuration and provisioning manners from each other. Configuration details vary along with changes of OS, middleware, applications, etc. Further, the prior art lacks solution provisioning for critical processes that allow for accelerating online updating of the solution and reducing overall costs, and that allow a user to substantially not feel the difference in provisioning processes of physical and virtual solutions. Thereby, online updating of solutions in the prior art are delayed, and it is hard to control the overall cost thereof.

According to one embodiment, a template image of a solution is provided, which includes configuration information of components included in the solution and scripts for installation components, and associates/relates both of them with each other. Thus, a complex operation requiring the user to configure each block is avoided.

According to another embodiment, a provisioning process is provided. For users, there is no difference whether the provisioning process is used to provision a physical solution or a virtual solution. That is, the provisioning process is consistent for physical solutions and virtual solutions, thereby shielding the difference in provisioning of physical solution and virtual solutions for users.

Terms that are used in the descriptions and embodiments presented below are specified here.

A "solution" as used herein refers to a set of machines, operating systems, middleware products, software packages, and/or virtual applications used for realizing a specific user's business requirements. A "physical solution" as used herein usually comprises machines, operating systems, middleware products, and/or software packages as requested. A "virtual solution" as used herein usually comprises virtual applications, such as virtual machines. "Solution provisioning" as used herein refers to a process of deploying an entire solution and activating it in time, and that the provisioning process is suitable for provisioning a physical solution as well as a virtual solution.

The following description is given in a cloud computing environment. However, it should be understood by those skilled in the art that the descriptions and embodiments described herein are not limited to this environment, and may be applied to any distributed network environment.

Figure 4:
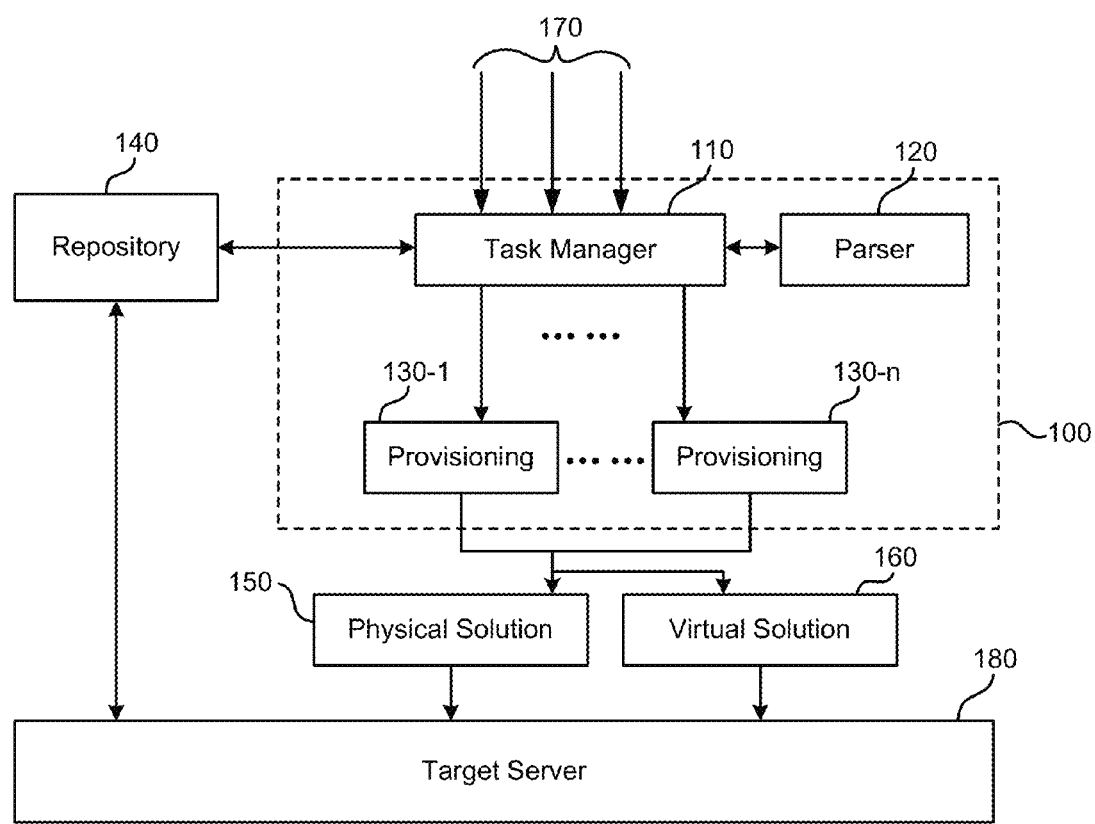
FIG. 4 shows a schematic block diagram of a system for solution provisioning in a cloud computing environment, according to one embodiment.

FIG. 4 shows a schematic block diagram of a hybrid solution provisioning (HSP) system 100 in a cloud computing environment according to one embodiment.

As shown in FIG. 4, according to one embodiment, a solution provisioning system comprises a repository 140, a physical solution engine 150, a virtual solution engine 160, a target server 180, and a hybrid solution provisioning engine (e.g., HSP engine) 100 according to one embodiment. In a cloud computing environment, these components may be distributed on different physical hosts, but may alternatively be distributed on the same physical host.

As shown by the dashed box in FIG. 4, according to one embodiment of the invention, a HSP engine 100 comprises a task manager 110, a parser 120, and a groups of provisioning implementers 130-1, . . . , 130-n (hereinafter commonly referred to as provisioning implementers 130, unless one or more provisioning implementers therein need to be distinguished from each other specifically), where n is an positive integer. The number of provisioning implementers 130 may be equal to or less than that of solutions being provisioned by the HSP engine 100.

The HSP engine 100 is a component or system for realizing solution provisioning, according to one embodiment. The HSP engine 100 is used to drive different existing provisioning tools to perform actual installation and configuration work of a component based on the type of each component, and to coordinate the entire process of solution provisioning.

The HSP engine 100 may provision a plurality of solutions simultaneously responsive to a plurality of provisioning requests 140, in one approach. HSP engine 100 coordinates and controls all the processes of solution provisioning. Moreover, HSP engine 100 further requests the provisioning image from the repository 140.

The provisioning image is described in detail below. Each of the provisioning images may be used for solution provisioning. The provisioning image comprises configuration information used for executing installation, scripts for executing installation, and information for mapping the configuration information to the scripts. Optionally, the provisioning image further comprises an installation medium, thus in this case, the provisioning image comprises all the information used for realizing a solution provisioning.

As an example, a provisioning image may comprise a metadata portion that may be used as configuration information. The metadata portion may include a physical configuration file, a syntax file, and a virtual configuration file. Each file is described in more detail below, according to one embodiment. The physical configuration file is described first.

1. A physical configuration file: this is a file describing the structure of a physical solution, including:
    1.1 an element for describing the components of the physical solution, comprising a name and component attributes for specifying a machine or product, including component type, component serial number, etc., each component corresponding to a software product in the solution;
    1.2 dependencies between the components; and
    1.3 configuration information of the components, which is disclosed so as to be customized during the course of provisioning, e.g., for physical software products, the configuration information corresponds to the installation options.

An example of physical configuration file of a physical solution is shown below:

```
ITM.yaml
    - Component : M1      //component name
    Type : Machine        // component type
    SN : 99FWP41          //serial number
    - Component : SLES10SP2-32
    Type : OS
    Status : installed    //status
    Host : M1             //host
    DiskSize : 10M        //disk size
    TargetDirectory : /vmfs/volumes/storage1/  // target directory
    Password : passw0rd   //password
    Install : Workflow:SPA.DeployOS  //relative path of installation
    program
    Hypervisor : VMware-3.5
    UserName : root       //user name
    OSFamily : Linux      //operating system family
    IP : 9.186.62.123     //IP address
    CPUType : 32-bit      // CPU type
    MemorySize : 1024     // memory size
    CPUAmount : 2         // CPU amount
    - Component: WasHV
    Type : Middleware
    Status : not-installed
    Host : SLES10SP2-32
    RootPassword : pw4test:
    IPAddress : 9.186.62.124
    ConfiguredIPAddress : 9.186.62.132
    Netmask : 255.255.255.0
    PrimaryDNS : 9.181.2.101
    SecondDNS : 9.181.2.102
    PowerOn : true
    Gateway : 9.186.62.7
    HostName : sam
```

The next file that is included in the metadata portion is a syntax file.

1. A syntax file: for mapping physical and virtual configuration information in a physical and virtual configuration file to scripts (e.g., commands and/or executable code), including:
    1.1 The names of scripts, such as telnet, ping, etc.
    1.2 Script options listed in a specified order (e.g., input parameters), for example, the input parameter of script ping, such as IP address 9.186.62.132.

Moreover, the options in the syntax file may further be associated with the parameters in physical/virtual configuration information files, so as to realize the customization of a certain component, in one embodiment. Such an association is realized by inputting a parameter name or attribute name, such as the attribute name of ConfigureIPAddress. For example, for the script ping, its input parameter IP address may not be included in a syntax file, but is in a corresponding configuration file, and the script is associated with the corresponding items in the configuration file (e.g., ConfigureIPAddress: 9.186.62.132), thereby obtaining the IP address according to the association during provisioning.

A syntax file example is shown below:

```
ITM.syntax.yaml
        WasHV :             //script name for middleware WasHV
        //below are the options of script WasHV
        HostName : ConfigNET.hostname //host name
        Domain : ConfigNET.domain    //domain name
        IPAddress : ConfigNET.ipaddr   //IP address
        Netmask : ConfigNET.netmask   //network mask
        Gateway : ConfigNET.gateway   //gateway name
        PrimaryDNS : ConfigNET.pri_dns //primary DNS name
        SecondDNS : ConfigNET.sec_dns //second DNS name
        RootPassword : ConfigPWD_ROOT.password //root password
        SLES10SP2-32 :  //script name for operating system SLES10SP2-
           32
        ......
```

Next, a virtual configuration file is described, according to one embodiment.
1. Virtual configuration file: this is a file describing a structure of a virtual solution, with content that is included in the virtual configuration file being similar to that in a physical configuration file, including:
   1.1 an element for describing the components of the virtual solution, comprising a name and component attributes for specifying a virtual machine or virtual product, including component type, component ID, etc., each component corresponding to a software product in the solution;
   1.2 dependencies between the components; and
   1.3 configuration information of the components, which is disclosed so as to be customized during the course of provisioning, e.g., for virtual software products, the configuration information corresponds to the installation options.

The virtual configuration file is described with Open Virtualization Format (OVF) format, according to one embodiment. OVF is specific for the case of provisioning a virtual solution, used for describing the virtual solution, provisioning customization attributes and Hypervisor information (including address and certification information).

Figure 5:
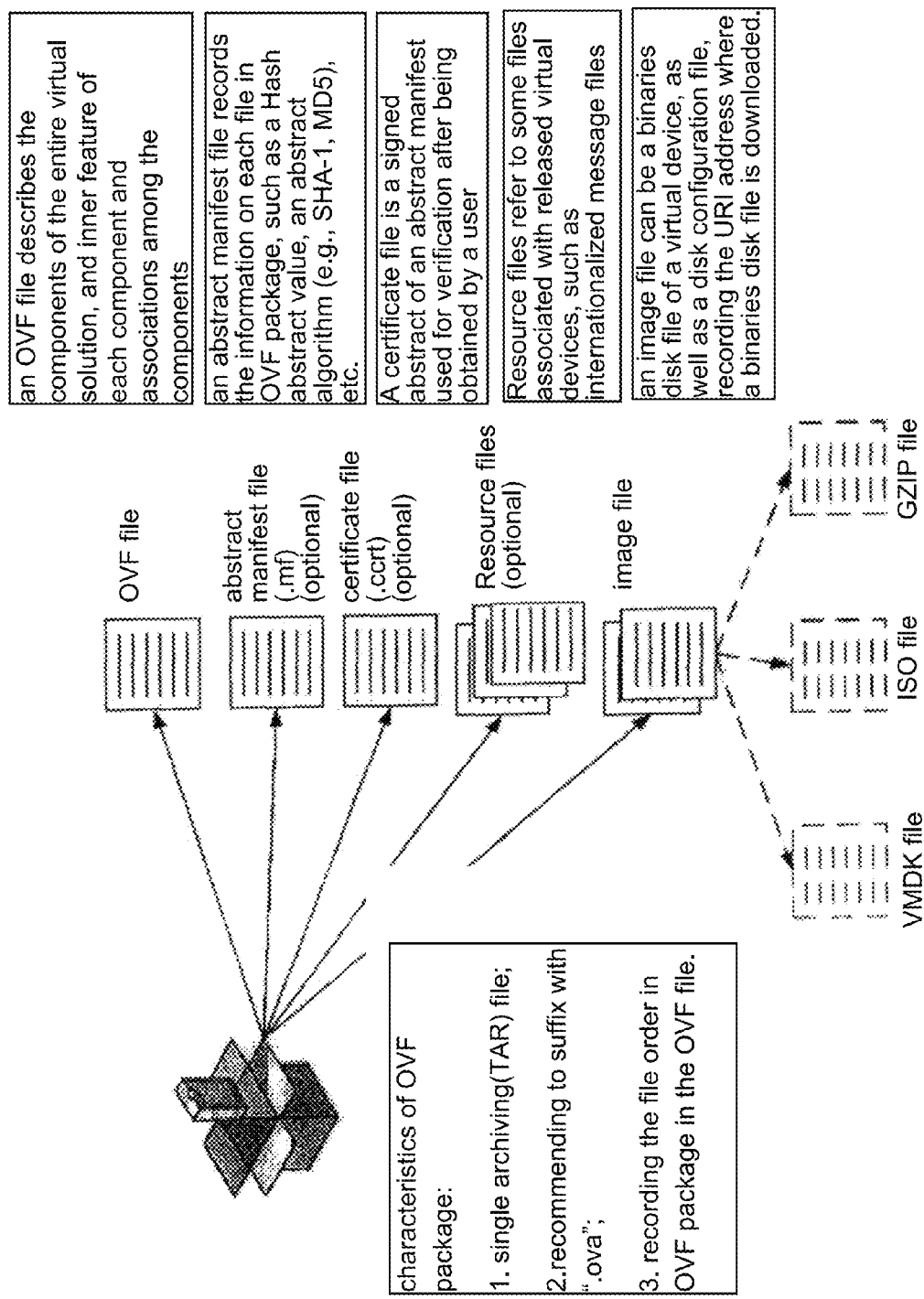
FIG. 5 shows a schematic diagram of an open virtualization format (OVF) package according to the OVF standard, in one embodiment.

OVF is an open standard for packaging and distributing a virtual tool (or software) running on a virtual machine. The standard describes an open, safe, transferrable, efficient and scalable format for packaging and distributing software to run on a virtual machine. OVF is briefly introduced in FIG. 5, according to one embodiment. FIG. 5 shows a schematic diagram of an OVF package according to the OVF standard.

The OVF standard defines three elements: OVF package, OVF descriptor and OVF environment file. OVF package is the core of OVF standard, OVF package is a distribution package, which comprises the following content: (1) an OVF descriptor file (.ovf). This usually represents OVF envelope and is mainly a subject supported by the tool. OVF descriptor file defines the content and demands of a package virtual tool to support successful and consistent provisioning of the package. OVF descriptor file adopts XML format. (2) 0 to 1 OVF manifest file (.mf). The manifest file comprises SHA-1 abstracts of all files in OVF package. The manifest is used to supply data integrity of the package. (3) 0 to 1 OVF certification file (.cert). OVF package can be signed by signing the manifest file. The signature of the abstract is stored in a .cert file along with a base64-encoded X.509 certificate. The certificate is used to ensure the authenticity of the package. (4) 0 to a plurality of disk image files. These files represent the virtual disk supporting the virtual image or tool defined. Usually, the package comprises a workpiece required by the tool, wherein a virtual disk, localized language resources and other workpieces are comprised.

The OVF envelope describes all virtual machine metadata (including virtual hardware) constituting the OVF package. The OVF envelope comprises the following parts: (1) version indication defined by XML name space URI; (2) a file reference list referring to all external files, which is a part of OVF package defined by References elements and its File sub element. They are usually virtual disk files, ISO images and international resources; (3) tool level metadata defined by section element for describing the content such as network and virtual disk, etc.; (4) a description of the tool content, which can be a single virtual machine (VirtualSystem element) or a series of virtual machines (VirtualSystemCollection element); (5) a message resources package norm aimed from 0 to a plurality of regions, where each region is defined by the corresponding element of strings. The OVF envelope is created and used in the stage of packaging and distributing a life period of a virtual tool.

The OVF environment is an XML file, which is generated by OVF provisioning platform during the process of provisioning OVF package, and is provided to be used by visitor software in the virtual system having been provisioned, according to one embodiment. The OVF environment file is used to provide the attribute variable information of the visitor software (belonging to the OVF package having been provisioned) of a virtual system, for "customizing" the visitor virtual system. The creator (OVF envelope) of the OVF package descriptor designates which custom attributes need variable input. In the provisioning activities of an OVF package, a provisioning platform will collect values associating with a self-defined attribute key, and construct the OVF environment file.

The OVF environment is used in the stage of provisioning a life period of a virtual tool.

The provisioning image also comprises scripts for executing installation. Each script is an executable file for executing installation and activation of each component by utilizing configuration information, such as in the metadata. A script (e.g., command) may be called to execute provisioning of a product. For a given product, a plurality of scripts may be used. Each script comprises a script path and a script syntax, including a script parameter and a right serial. For example, path Install: Workflow: SPA.DeployOS is a relative path.

The provisioning image also includes installation media. Any installation media files may be included, such as installation media binaries files, installation media wizard, installation media package, product script, virtual application, etc., such as TPM workflows.

According to one embodiment, the provisioning image may help the provisioning engine learn the inner dependencies of the solutions, and understand the structures of the solutions, such as the files packaged in the solutions, for what the files are used and how to use the files; and describing the syntax of the provisioning script packaged in the solutions, such as valid parameter name/value and parameter pairs, such that configuration can be performed automatically in the process of provisioning, without any input of the configuration information manually by the users. The provisioning image can be compressed into the files to distribute over a network, in one approach.

These provisioning images need not be integrated together with an HSP engine, but may be located on another server in the network. Furthermore, a provisioning image may be created by using the format described above and uploaded to a provisioning image repository, which may be used to store and share solution images for different services, in one approach. The provisioning image repository allows different technicians in a software development team contribute their solution images. Since different users may need the same or similar services, reusing the provisioning image by reusing or simply modifying a portion of metadata is possible and highly efficient. The provisioning image repository may maintain and manage the provisioning images contributed by different users, thereby reducing the online time of the solutions, in one approach.

As shown in FIG. 4, as an example, the provisioning image is shown being stored in the repository 140 on another physical host. The repository 140 is used to store a plurality of provisioning images contributed by different technicians according to an embodiment. HSP engine 100 and the repository 140 interact to obtain the provisioning image. In the example of FIG. 4, suppose the provisioning image comprises installation media, it comprises thereby all information required to realize a solution provisioning.

Task manager 110, responsive to the request 170 of solution provisioning received, establishes the provisioning task, obtains the provisioning image for the provisioning task, and configures and launches provisioning implementers 130 based on the provisioning image obtained. Provisioning implementers 130 are used for executing and monitoring the provisioning task assigned to it by the task manager 110. The operations of all the provisioning implementers is coordinated and controlled by the task manager 110.

The task manager 110 calls for provisioning images having the same name from the repository 140 based on the solution names in the solution provisioning request. After obtaining the provisioning image, the task manager 110 launches a corresponding provisioning implementer 130, and transmits the corresponding information in the provisioning image to the provisioning implementer 130.

Preferably, before launching a provisioning implementer 130 to execute a task for a solution provisioning, the task manager 110 first checks whether the solution is being provisioned or has been provisioned on the target server. The check is based on job control data maintained in HSP engine 100 and data comprised in the solution provisioning request, such as the name of the solution.

The embodiment proposes "job control data" for synchronizing and avoiding repeated provisioning of the same solution on the same server. By default, the job control data comprises the solution name, the transfer (its value can be completed or uncompleted) from an installation media to the target server. Optionally, the job control data further comprises the unpacking (its value can be started or completed) of a provisioning image on the target server and execution (its value can be waiting, executing or completed) of a script. An exemplary example of the job control data is shown below:

```
SolutionName : ITM    //solution name being ITM
  -Transfer: completed //transfer of installation media having
      //completed
```

-continued

```
  -Unpack: Started    //unpacking being started, optional
  -Script: Waiting    //script being waiting for execution,
  // and its value can be a default value,
  //optional
```

If it is determined that the same solution is being or has been provisioned on the target server, then the task manager 110 discards the solution provisioning request and/or returns a prompt message, such as "the same solution is being or has been provisioned," thereby avoiding the conflict caused by repeated provisioning of a same solution on the same target server. Certainly, the task manager 110 may also not respond to the solution provisioning request, in place of sending the prompt message.

After it is determined that there is not a same solution being or having been provisioned on the target server, the task manager 110 creates the job control data for the solution. Except for that item of the solution name in the job control data being filled with the name carried in the provisioning request, all other items have a default value or are null.

After having created the job control data, task manager 110 calls for the provisioning image having the same name from repository 140 based on the solution name, and then launches corresponding provisioning implementer 130, and transfers the job control data created for the provisioning task to the provisioning implementer 130 launched.

After having been launched, provisioning implementer 130 instructs the repository 140 to transfer the corresponding provisioning image to a target server 180. After being transferred successfully, the system will return a message of transfer success to the provisioning implementer 130, and transfer back corresponding information, such as a file path. After receiving a success instruction, the provisioning implementer 130 modifies the value of the item transfer in the job control data to be completed. If the provisioning implementer 130 still does not receive the message of transfer success after a predefined time period after sending an instruction, the provisioning implementer 130 may default a transfer failure, and may instruct again the repository 140 to transfer module image to the target server 180.

In the case of the module image not including installation media, after being launched, the provisioning implementer 130 may instruct other parties having installation media to transfer the installation media to the target server.

The provisioning implementer 130 may begin to execute a script by default after a predetermined time (e.g., 1 minute, 10 minutes, 20 minutes, or longer or shorter) after receiving the message of transfer success.

Alternatively, in the case where the job control data comprises the items Unpack and Script, the provisioning implementer 130 further records their values as described below, in one approach. After transferring successfully, the module image is unpacked automatically on the target server 180. If automatic unpacking succeeds, the system will return the message of automatic unpacking success to the provisioning implementer 130. After receiving success instruction, the provisioning implementer 130 modifies the value of the item Unpack in the job control data to be started.

After being unpacked successfully, the system will return the message of unpack completion to the provisioning implementer 130, and meanwhile return corresponding information, such as a folder path including the unpack files. After receiving the success instruction, the provisioning implementer 130 modifies the value of the item Unpack in the job control data to be completed, in one approach.

If the provisioning implementer 130 still does not receive a message of unpack success after a predefined time period from the beginning of receiving a message of automatic unpacking success, the provisioning implementer 130 may default an unpack failure, and may again instruct the repository 140 to transfer module image to the target server 180, repeating the above process, in one approach.

Alternatively, after receiving an instruction from the provisioning implementer 130, repository 140 unpacks corresponding module image to merely obtain the installation media therein, and then compresses the installation media to a compressed file, such as ITM.zip file, and transfers the compressed file to target server 180, in one approach.

After receiving the required provisioning image from the repository 140, task manager 110 transfers the provisioning image to parser 120. Certainly, the parser 120 may also be integrated with the task manager 110 into one unit, in one approach.

Parser 120 is used to unpack the provisioning image, and merely obtains the metadata and script therein. It shall be noted that the repository 140 can unpack the corresponding provisioning image after receiving the provisioning image request from the task manager 110, obtain the metadata and script therein, and compress it into a compressed file having the same name as the module image (or another name), and then transfer the compressed file to the task manager 110. Consequently, the parser 120 merely needs to execute unpacking. Then, the parser 120 returns the information parsed to the task manager 110, in one approach.

Once receiving the metadata and script of parser 120, the task manager 110 transfers the metadata and script to provisioning implementer 130 launched for the provisioning task, in one approach.

Having received the metadata and script from the task manager 110, the provisioning implementer 130 checks whether the value of the item "Unpack" in the job control data is "completed" or not. If it is not, provisioning implementer 130 may wait, and periodically check the value of the item "Unpack." Once the value of the item "Unpack changes to "completed," the provisioning implementer 130 opens the syntax file in the metadata, and executes script according to the script order listed in the syntax file, and transfers the options listed in the syntax file to corresponding scripts simultaneously.

For a solution, there can be one or more scripts. The number and content of the scripts is customized by the user on demand. The difference of configuration information caused by the difference of demands is reflected in a physical/virtual configuration file. That is, the script is associated with the configuration information. While customizing a script, the user writes the corresponding configuration information used by the script in the physical/virtual configuration file. For example, for the installation of the component SLES10SP2-32, the disk size required can vary by different machines. Therefore, the users can associate the script SLES10SP2-32 with the disk size required, and change the value of the item DiskSize whose component ID in the physical configuration file is SLES10SP2-32 to be 10M.

With respect to each script, the provisioning implementer 130 determines whether the configuration file is physical or virtual according to the type of the component in the configuration file associated with the script, and then executes corresponding script by calling physical solution engine 150 or virtual solution engine 160, and meanwhile the provisioning implementer 130 sets the value of the item Script in the job control data as Executing.

Physical solution engine 150 is an existing tool used for provisioning physical solutions, and is called by HSP engine 100, such as Red Hat RPM Package Manager, FreeBSD Ports System, Windows Installer as well as Enterprises JavaBeans (EJB), xCat, IBM Tivoli Rembo, IBM Solution Assembly Toolkit (SAT), etc. Virtual solution engine 160 is an existing tool used for provisioning virtual solutions, and is called by HSP engine 100, such as XEN.

Having provisioned, physical solution engine 150 or virtual solution engine 160 returns a provisioning completion indication to provisioning implementer 130. Having received the provisioning completion indication of the last script in the syntax file, provisioning implementer 130 sets the value of the item Script in the job control data as "Completed." Once the value of script is set to "Completed," provisioning implementer 130 returns the provisioning completion indication to the task manager 110. After receiving the provisioning completion indication, task manager 110 releases corresponding provisioning implementer 130.

Task manager 110 and provisioning implementer 130 both need to maintain their own data according to one embodiment. For example, task manager 110 may also maintain the status information of each task (e.g., whether or not the task is running or succeed) as well as the resource information associated with each task (e.g., the size of memory required) and log information. Provisioning implementer 130 may also maintain the status information, resource information and log information and the like for each solution provisioning. The information in HSP engine 100 may be stored in a database and may also be stored as a data file, as long as relevant information may be stored, in one approach.

If the solution provisioning has not been completed or succeeded, provisioning implementer 130 will set the value of the item Script in the job control data to a specified value, such as "Error." Then, during the provisioning of the solution next time, the task manager 110 further makes a check before provisioning. In this case, the job control data for the solution has existed, but the value of the item Script therein is Error; that is, the provisioning is not executing or uncompleted. Thus, task manager 110 finds out the existing metadata and script for the solution according to the information maintained by it, and starts provisioning implementer 130 to execute the script based on the metadata again.

As known by those skilled in the art, the various components shown in FIG. 4, such as task manager, parser, and every provisioning implementer, may be realized as one or more hardware units, such as an application-specific integrated circuit (ASIC), a digital signal processing (DSP) module, etc., and may further be realized as one or more software units, such as separate programs, code blocks, modules, etc., or may be realized as a combination thereof. Its specific implementation depends on the user's systems, structures, and desires.

Figure 6:
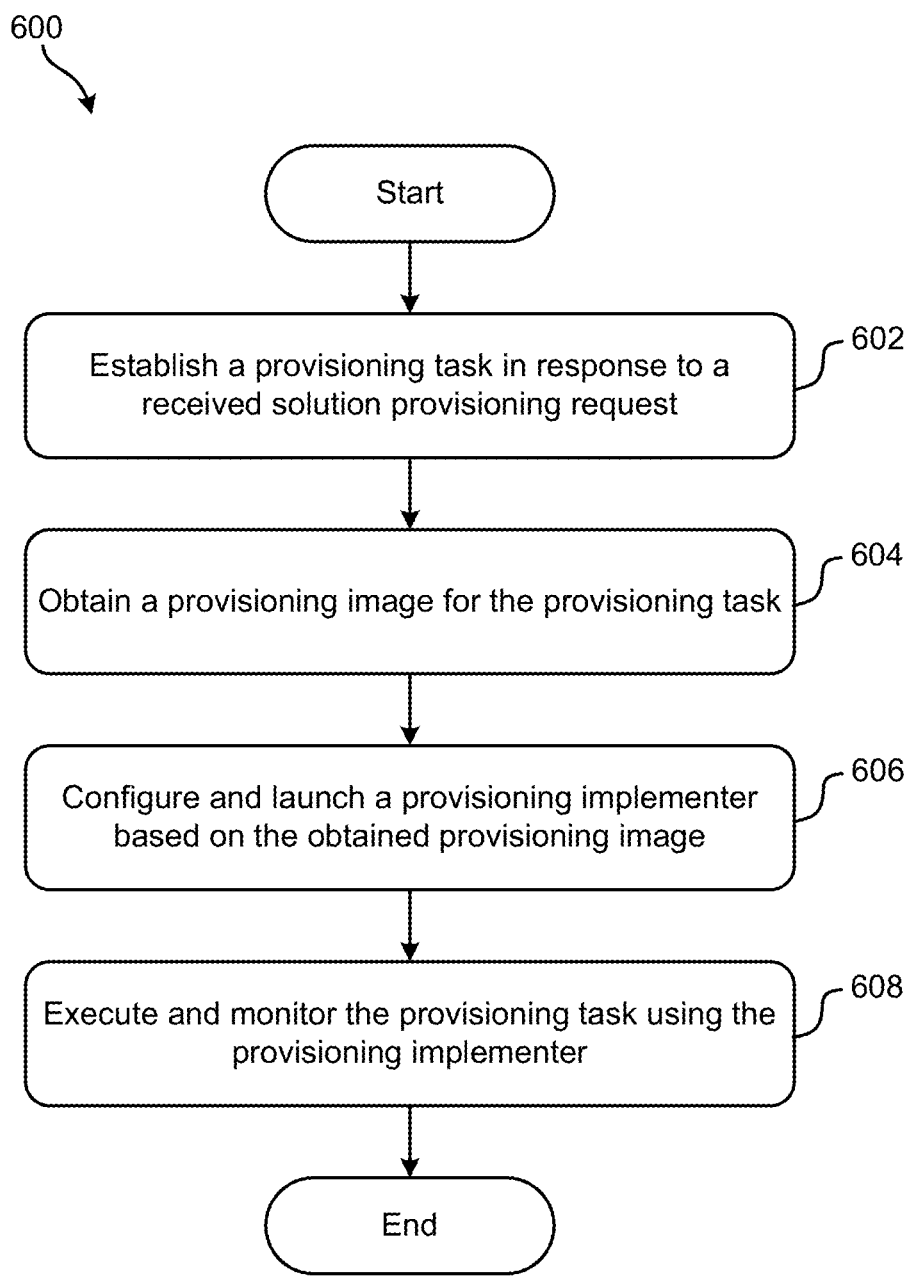
FIG. 6 shows a schematic block diagram of a method for solution provisioning in a cloud computing environment, according to one embodiment.

FIG. 6 shows a schematic block diagram of a method 600 for solution provisioning in a cloud computing environment according to one embodiment. The method 600 may be executed in any desired environment, including those described in FIGS. 1-5, in various embodiments.

In operation 602, it is determined whether or not a solution provisioning request is received. If yes, a provisioning task is established for the solution provisioning request, and the method 600 proceeds to operation 604; otherwise, the method 600 returns to operation 602.

In operation 604, a provisioning task is established for the solution provisioning request.

In operation 606, a provisioning image for the provisioning task is obtained. It may be obtained by requesting a corresponding provisioning image from the repository based on the solution name in the solution provisioning request.

In operation 608, the provisioning implementer is configured and launched based on the provisioning image obtained. The configuration is realized by parsing the provisioning image obtained and transferring the parsed provisioning image to the provisioning implementer.

In operation 610, the provisioning task is executed and monitored by the provisioning implementer. As described above, the operation is provisioning based on the information in the provisioning image obtained. It is realized by using the configuration file in the metadata to execute the script according to the order prescribed by the syntax file in the metadata.

The method 600 described above is used when executing the solution provisioning for the first time. As described above, if the first execution is uncompleted or failed, when executing the solution provisioning subsequently, operation 606 may be omitted.

The embodiments described above may be realized in any appropriate manner, including hardware, software, firmware, or any combinations thereof. Or, the embodiments may at least be partially realized as computer software running on one or more data processor and/or digital signal processors. The elements and components of the embodiments may be realized physically, functionally, and logically in any appropriate manner. Also, the function may be realized in one component, multiple components, or as a part of other functional components. Thus, the embodiments may be realized in one single component, or may be physically and functionally distributed between different components and processors.

In one embodiment, a computer program product for solution provisioning comprises a computer readable storage medium having computer readable program code embodied therewith. The computer readable program code includes computer readable program code configured to establish a provisioning task in response to a received solution provisioning request, computer readable program code configured to obtain a provisioning image for the provisioning task, computer readable program code configured to configure and launch a provisioning implementer based on the obtained provisioning image, and computer readable program code configured to execute and monitor the provisioning task using the provisioning implementer. The provisioning image comprises configuration information used for executing installation, scripts for executing installation, and information for mapping the configuration information to the scripts.

In another embodiment, the configuration information may comprise at least one of the following: physical configuration information describing a structure of a physical solution, and virtual configuration information describing a structure of a virtual solution.

According to another embodiment, the information for mapping the configuration information to the scripts may comprise script names and script options listed according to a specified order.

In yet another embodiment, the computer program product may include computer readable program code configured to parse the provisioning image to obtain the configuration information in the provisioning image, wherein the computer readable program code configured to configure the provisioning implementer comprises computer readable program code configured to transfer the configuration information obtained from the provisioning image through parsing to the provisioning implementer.

In another embodiment, the computer program product may include computer readable program code configured to determine that the solution requested is being or has been provisioned on a target server based on the solution provisioning request before launching the provisioning implementer, and computer readable program code configured to return a prompt message.

In yet another embodiment, the computer program product may include computer readable program code configured to determine that the requested solution is not being or has not been provisioned on the target server, and computer readable program code configured to create job control data for synchronization with respect to the solution provisioning request to synchronize and avoid repeated provisioning of a same solution on a same sever. The job control data at least comprises a solution name and an item indicating a transfer from an installation media to the target server. In a further embodiment, the job control data may comprise an item indicating decompression of a provisioning image on the target server and an item indicating execution of scripts.

According to another embodiment, the computer program product may include a plurality of provisioning implementers, wherein each provisioning implementer is configured to provision at least one solution.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus for solution provisioning, the apparatus comprising:
a hardware processor;
a task manager running on the hardware processor, the task manager being configured to establish a provisioning task and obtain a provisioning image for the provisioning task; and
wherein the task manager configures a provisioning implementer based on the provisioning image obtained, and
wherein the provisioning image comprises configuration information used for executing installation, scripts for executing installation, and information for mapping the configuration information to the scripts.

2. The apparatus according to claim 1, comprising a provisioning implementer configured to execute and monitor the provisioning task established by the task manager.

3. The apparatus according to claim 1, wherein the configuration information comprises at least one of the following: physical configuration information describing a structure of a physical solution and virtual configuration information describing a structure of a virtual solution.

4. The apparatus according to claim 1, wherein the information for mapping the configuration information to the scripts comprises script names and script options listed according to a specified order.

5. The apparatus according to claim 1, comprising a parser configured to parse the provisioning image to obtain information from the provisioning image, wherein the task manager configures the provisioning implementer by transferring the configuration information obtained from the provisioning image through parsing to the provisioning implementer.

6. The apparatus according to claim 1, wherein before launching the provisioning implementer, the task manager receives a solution provisioning request and determines that a requested solution is being or has been provisioned on a target server based on the solution provisioning request and returns a prompt message.

7. The apparatus according to claim 1, comprising a plurality of provisioning implementers, wherein each provisioning implementer is configured to provision at least one solution.

8. A system for solution provisioning, comprising:
the apparatus according to claim 1;
a repository for storing the provisioning image; and
a target server on which the solution is provisioned.

9. A method for solution provisioning, the method comprising:
establishing a provisioning task;
obtaining a provisioning image for the provisioning task from a hardware memory; and
configuring, using a hardware processor, a provisioning implementer based on the obtained provisioning image,
wherein the provisioning image comprises configuration information used for executing installation, scripts for executing installation, and information for mapping the configuration information to the scripts.

10. The method according to claim 9, comprising executing and monitoring the provisioning task using the provisioning implementer.

11. The method according to claim 9, wherein the configuration information comprises at least one of the following: physical configuration information describing a structure of a physical solution, and virtual configuration information describing a structure of a virtual solution.

12. The method according to claim 9, wherein the information for mapping the configuration information to the scripts comprises script names and script options listed according to a specified order.

13. The method according to claim 9, comprising parsing the provisioning image to obtain the configuration information in the provisioning image, wherein configuring the provisioning implementer comprises transferring the configuration information obtained from the provisioning image through parsing to the provisioning implementer.

14. The method according to claim 9, comprising, before launching the provisioning implementer:
receiving a solution provisioning request;
determining that a requested solution is being or has been provisioned on a target server based on the solution provisioning request, and returning a prompt message; and
determining that the requested solution is not being or has not been provisioned on the target server, and creating job control data for synchronization with respect to the solution provisioning request to synchronize and avoid repeated provisioning of a same solution on a same server,
wherein the job control data comprises a solution name, an item indicating a transfer from an installation media to the target server, an item indicating decompression of a provisioning image on the target server, and an item indicating execution of scripts.

15. The method according to claim 9, comprising a plurality of provisioning implementers, wherein each provisioning implementer is configured to provision at least one solution.

16. A computer program product for solution provisioning, the computer program product comprising a non-transitory computer readable storage medium having program instructions embodied therewith, the program instructions executable by a processor to cause the processor to:
establish, by the processor, a provisioning task;
obtain, by the processor, a provisioning image for the provisioning task; and
configure, by the processor, a provisioning implementer based on the obtained provisioning image,
wherein the provisioning image comprises configuration information used for executing installation, scripts for executing installation, and information for mapping the configuration information to the scripts.

17. The computer program product according to claim 16, wherein the configuration information comprises at least one of the following: physical configuration information describing a structure of a physical solution, and virtual configuration information describing a structure of a virtual solution, and wherein the information for mapping the configuration information to the scripts comprises script names and script options listed according to a specified order.

18. The computer program product according to claim 16, wherein the program instructions are executable by a processor to cause the processor to parse the provisioning image to obtain the configuration information in the provisioning image, wherein configuring the provisioning implementer comprises includes transferring the configuration information obtained from the provisioning image through parsing to the provisioning implementer.

19. The computer program product according to claim 16, wherein the program instructions are executable by a processor to cause the processor to:
receive a solution provisioning request;
determine that a requested solution is being or has been provisioned on a target server based on the solution provisioning request before launching the provisioning implementer and return a prompt message; and
determine that the requested solution is not being or has not been provisioned on the target server and create job control data for synchronization with respect to the solution provisioning request to synchronize and avoid repeated provisioning of a same solution on a same server, wherein the job control data comprises a solution name, an item indicating a transfer from an installation media to the target server, an item indicating decompression of a provisioning image on the target server, and an item indicating execution of scripts.

20. The computer program product according to claim 16, wherein the program instructions are executable by a processor to cause the processor to execute and monitor the provisioning task using the provisioning implementer.

* * * * *